United States Patent
Choi et al.

(10) Patent No.: US 7,872,963 B2
(45) Date of Patent: Jan. 18, 2011

(54) MIMO-OFDM SYSTEM USING EIGENBEAMFORMING METHOD

(75) Inventors: In-Kyeong Choi, Daejeon (KR); Seong-Rag Kim, Daejeon (KR); Dong-Seung Kwon, Daejeon (KR); Jin-Ho Choi, Dudndas (AU)

(73) Assignee: Electronics and Telecommunications Research Institute, Daejeon (KR)

( * ) Notice: Subject to any disclaimer, the term of this patent is extended or adjusted under 35 U.S.C. 154(b) by 1031 days.

(21) Appl. No.: 10/584,641

(22) PCT Filed: Nov. 25, 2004

(86) PCT No.: PCT/KR2004/003065

§ 371 (c)(1),
(2), (4) Date: Jan. 23, 2007

(87) PCT Pub. No.: WO2005/062729

PCT Pub. Date: Jul. 14, 2005

(65) Prior Publication Data

US 2007/0177681 A1  Aug. 2, 2007

(30) Foreign Application Priority Data

Dec. 27, 2003  (KR) ................. 10-2003-0098216
Dec. 27, 2003  (KR) ................. 10-2003-0098217

(51) Int. Cl.
*H04J 11/00* (2006.01)
(52) U.S. Cl. .............. 370/208; 370/260; 370/280; 370/281; 370/328; 370/338
(58) Field of Classification Search .......... 455/13.3–25; 370/204–211
See application file for complete search history.

(56) References Cited

U.S. PATENT DOCUMENTS 6,131,016 A  10/2000  Greenstein et al.
6,768,713 B1  7/2004  Siala et al.

(Continued)

FOREIGN PATENT DOCUMENTS

CN  1433175  7/2003

(Continued)

OTHER PUBLICATIONS

Jinho Choi.; "A semiblind Method for Transmit Antenna Arrays in CDMA Systems".

(Continued)

*Primary Examiner*—Dai A Phuong
(74) *Attorney, Agent, or Firm*—Lowe Hauptman Ham & Berner LLP

(57) ABSTRACT

Disclosed is a MIMO-OFDM system, wherein the transmitter comprises a serial/parallel converter for converting continuously inputted symbols of the number of subcarriers to K parallel signals; a signal reproducer for reproducing K parallel signals by the number of transmit antennas L an eigenmode generator for generating eigenbeam of the reproduced signals outputted from the signal reproducer at each subcarrier, on the basis of Nf eigenbeam forming vectors which are fed back long-term and information of a best eigenbeam forming vector at each subcarrier which is fed back short-term, through the feedback device; and a plurality of inverse Fourier converters for receiving the signals outputted from the eigenmode generator and generating an OFDM symbol.

20 Claims, 5 Drawing Sheets

U.S. PATENT DOCUMENTS

| | | | |
|---|---|---|---|
| 7,050,776 B2 | 5/2006 | Kim et al. | |
| 7,171,240 B2 | 1/2007 | Kim et al. | |
| 7,447,270 B1 * | 11/2008 | Hottinen | 375/267 |
| 7,471,963 B2 | 12/2008 | Kim et al. | |
| 2003/0144032 A1 | 7/2003 | Brunner et al. | |
| 2005/0094740 A1 * | 5/2005 | Borran et al. | 375/267 |

FOREIGN PATENT DOCUMENTS

| | | |
|---|---|---|
| JP | 2000-183844 | 6/2000 |
| JP | 2003-509963 | 3/2003 |
| JP | 2003-234693 | 8/2003 |
| JP | 2003-318815 | 11/2003 |
| KR | 1020010036597 | 5/2001 |
| KR | 1020010087715 | 9/2001 |
| KR | 1020030033601 | 5/2003 |
| KR | 1020030059374 | 7/2003 |
| KR | 1020030080593 | 10/2003 |
| WO | 01/91323 | 11/2001 |
| WO | WO 02/33850 | 4/2002 |
| WO | 03/043245 | 5/2003 |
| WO | 03/085876 | 10/2003 |
| WO | WO 03/081803 | 10/2003 |

OTHER PUBLICATIONS

Jinho Choi, et al.; "An Adaptive Technique for Transmit Antenna Diversity with Feedback".

Pan et al.; "Dynamic Sub-channel Allocation with Adaptive Beamforming for Broadband OFDM Wireless Systems"; IEEE; 2002; pp. 711-715.

Wong et al.; "Adaptive Antennas at the Mobile and Base Stations in an OFDM/TDMA System"; IEEE; Jan. 2001; pp. 195-206.

Published Issue Patent dated Jul. 30, 2006, for Korean application No. 10-2003-0098217.

Office Action dated Mar. 24, 2009, for Japanese application No. 2006-546811.

"A daptive Antennas at the Mobile and Base Stations in an OFDM/TDMA System", Kai-Kit Wong et al, *IEEE Transaction on Communications*. vol. 49, No. 1, Jan. 2001, pp. 195-206.

* cited by examiner

MIMO-OFDM SYSTEM USING EIGENBEAMFORMING METHOD

CROSS REFERENCE TO RELATED APPLICATION

This application is the National Phase application of International Application No. PCT/KR2004/003065, filed Nov. 25, 2004, which designates the United States and was published in English. This application, in its entirety, is incorporated herein by reference.

BACKGROUND OF THE INVENTION (a) Field of the Invention

The present invention relates to a Multiple Input Multiple Output (MIMO)—Orthogonal Frequency Division Multiplexing (OFDM) system. More specifically, the present invention relates to a MIMO-OFDM system using eigenbeam forming in a downlink.

(b) Description of the Related Art

A beam forming method has been used to obtain the antenna array gain to improve performance. Also, the beam forming method can be used to use a space domain in a downlink channel of a MIMO system. Generally, a base station is required to have instantaneous channel information in a downlink to apply a closed-loop downlink beam forming method. In a Frequency Division Duplexing (FDD) mode, a mobile station is required to feedback the instantaneous information to the base station, since frequency bands are different between uplink channel and downlink channel. Here, when the amount of the feedback information is large, the feedback information hinders the closed loop beam forming. Thus, a method capable of reducing the feedback information is required to be investigated.

The blind beam forming method adaptively forms a downlink beam by measuring an uplink channel, under the assumption that spatial statistical properties of the channels are similar, since constructions for transferring conditions are similar in both uplink and downlink. The method does not require feedback information since the method uses reciprocity of the channels; however the method does not satisfy diversity gain since the beam forming vector does not include the instantaneous channel variation. To obtain space diversity gain, it is necessary to feed back the instantaneous channel information in the downlink. Here, the amount of feedback information increases, and the feedback rate for tracking channel variation increases when the number of transmit antennas increases. Thus, it is difficult to apply the beam forming method when the number of transmit antennas is large or the speed of the mobile station is high. To solve the above problems, several methods are proposed, as follows.

An eigenbeam forming method proposed by the $3^{rd}$ Generation Partnership Project (3GPP) uses spatial correlation and selection diversity. The spatial correlation can allows long-term feedback with much feedback information, and the selection diversity can requires a very small amount of feedback information when short-term feedback is required in accordance with the instantaneous channel variation. That is, according to the eigenbeam forming method, the mobile terminal finds a dominant eigenmode by using a spatial covariance matrix of which a short term update is not necessary and feeds back the dominant eigenmode; and the mobile terminal feeds back the strongest eigenmode in the uplink by using the instantaneous channel variation among dominant eigenmodes. The base station selects the strongest eigenmode and transmits the signals. Thus, the eigenbeam forming method can obtain the selection diversity gain in addition to the signal-to-noise ratio gain.

From the situation that the antenna array of the base station is generally located on the top of some buildings, the down link channel exhibits to have a high spatial correlation or few dominant eigenmodes. Since there are no local scatters around the antenna array of the base station, the signal can be spatially selectively transmitted with only few directions. It is regarded that the eigenmode generates an independent path between the base station and the mobile station. The eigenbeam forming method can be effectively used in this condition.

However, when the eigenbeam forming method is applied to the OFDM system, each subcarrier of OFDM is selectively faded at different frequencies in the OFDM system. Thus, each subcarrier has a different beam forming vector and all subcarriers are required to feed back their beam forming vectors. In this case, the amount of the feedback information becomes very much larger than that of the single subcarrier, and the feedback information provides a severe burden to the system.

SUMMARY OF THE INVENTION

It is an advantage of the present invention to reduce an amount of feedback information for eigenbeam forming in an OFDM system.

To achieve the advantage, one aspect of the present invention is a Multiple Input Multiple Output (MIMO)—Orthogonal Frequency Division Multiplexing (OFDM) system comprising a transmitter with L transmit antennas, a receiver with M receive antennas, and an uplink feedback device for providing information of the receiver to the transmitter, wherein the transmitter comprises: a serial/parallel converter for converting continuously inputted symbols of the number of subcarriers to K parallel signals; a signal reproducer for reproducing K parallel signals by the number of transmit antennas L; an eigenmode generator for generating an eigenbeam of the reproduced signals outputted from the signal reproducer at each subcarrier, on the basis of $N_f$ eigenbeam forming vectors which are fed back long-term and information of a best eigenbeam forming vector at each subcarrier which is fed back short-term, through the feedback device; and a plurality of inverse Fourier converters for receiving the signals outputted from the eigenmode generator and generating an OFDM symbol.

Another aspect of the present invention is an MIMO-OFDM system comprising: a serial/parallel converter for converting continuously inputted symbols of the number of subcarriers to K parallel signals; a signal reproducer for reproducing K parallel signals outputted from the serial/parallel converter by the number of extant transmit antennas; an eigenbeam calculator for calculating an instantaneous channel covariance and a spatial covariance matrix by using the uplink channel information, providing $N_f$ dominant eigenbeam forming vectors from the spatial covariance matrix, and providing the eigenvalue of the instantaneous channel covariance; an eigenmode selector for selecting an eigenmode of which the eigenvalue of the instantaneous channel covariance is maximum among $N_f$, whenever $N_f$ eigenbeam forming vectors are inputted from the eigenbeam calculator and the instantaneous channel covariance is updated; and a plurality of inverse Fourier converters for receiving the signals outputted from the eigenmode selector and generating an OFDM symbol.

Another aspect of the present invention is a MIMO-OFDM system comprising a transmitter with L transmit antennas, a receiver with M receive antennas, and an uplink feedback device for providing information of the receiver to the transmitter, wherein the transmitter comprises: a serial/parallel converter for converting continuously inputted symbols of the number of subcarriers to K parallel signals; a signal reproducer for reproducing K parallel signals outputted from the serial/parallel converter by the number of transmit antennas L; an eigenmode generator for generating one eigenbeam for each group of subcarriers, on the basis of long-term feedback information corresponding to $N_f$ eigenbeam forming vectors and short-term feedback information corresponding to a group of subcarriers which are provided through the feedback device; and a plurality of inverse Fourier converters for receiving the signals outputted from the eigenmode generator and generating an OFDM symbol.

Another aspect of the present invention is a beam forming method for a MIMO-OFDM system comprising a transmitter with L transmit antennas and a receiver with M receive antennas, comprising: (a) converting continuously inputted symbols of the number of subcarriers to K parallel signals; (b) reproducing K parallel signals by the number of transmit antennas L; and (c) generating one eigenbeam for each group of subcarriers, on the basis of long-term feedback information corresponding to $N_f$ eigenbeam forming vectors and short-term feedback information corresponding to the group of subcarriers.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Figure 1:
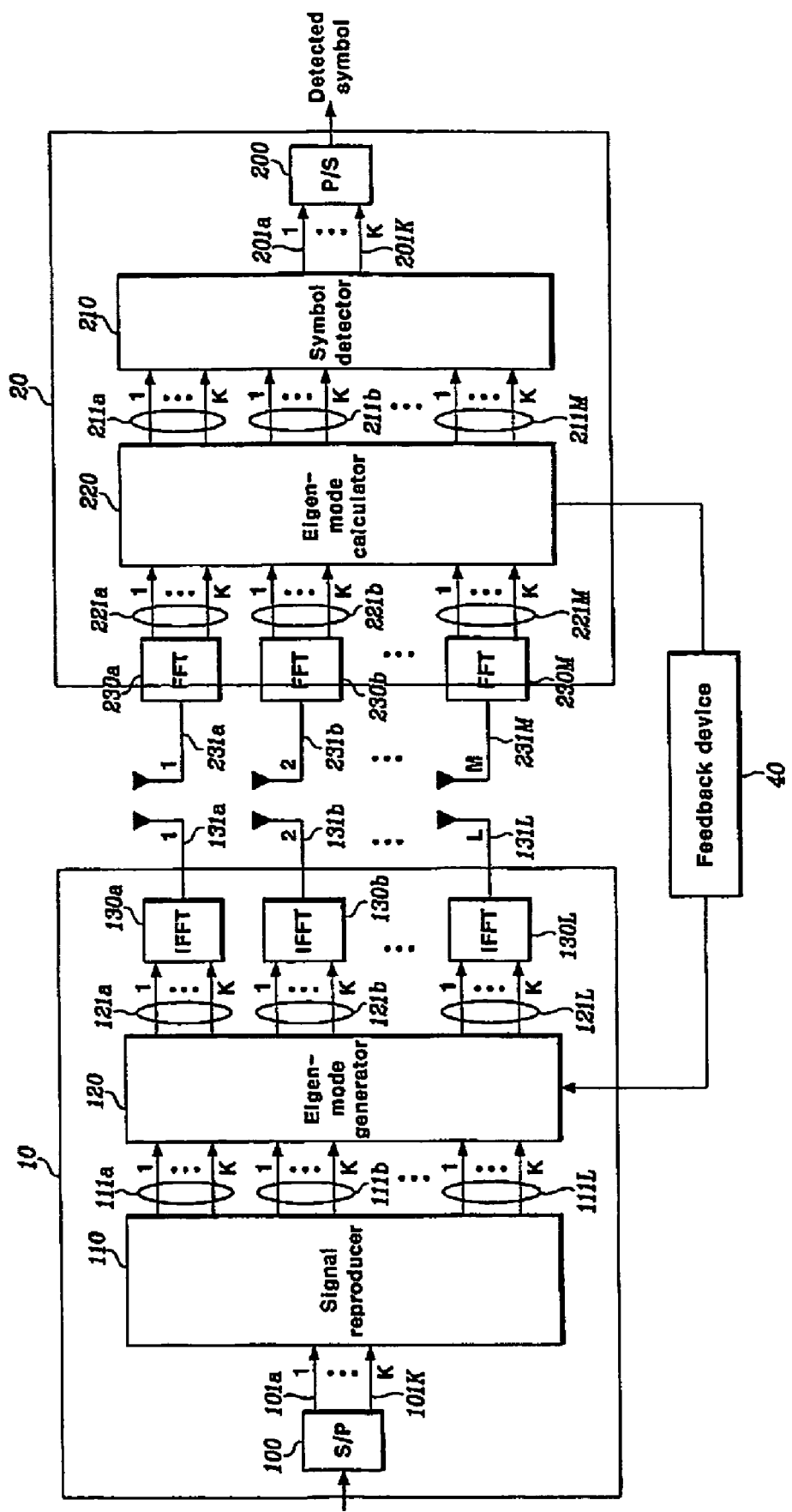
FIG. 1 shows a MIMO-OFDM system according to a first exemplary embodiment of the present invention.

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive. To clarify the present invention, parts which are not described in the specification are omitted, and parts for which similar descriptions are provided have the same reference numerals.

In a MIMO system with a single carrier wherein the number of transmit antennas is L and the number of receive antennas is M, a received signal vector r(q) at the $q^{th}$ symbol period is as in the following Equation 1.

$$r(q) = \sqrt{\gamma} H(q) w s(q) + n(q) \quad \text{[Equation 1]}$$

Here, r is a transmitting signal to noise ratio, $r(q)=[r_1(q) r_2(q) \ldots r_M(q)]^T$, $H(q)$ ($[H(q)]_{m,l}=h_{m,l}$, $m=1, \ldots, M$, $l=1, \ldots, L$) is a channel, and $w(w=[w_1, \ldots, w_L]^T)$ is a weight vector. Here $\|w\|=1$ is assumed. And a noise vector $n(q)$, $(n(q)=[n_1, \ldots, n_M]^T)$ satisfying the equation $E[n(q)n^H(q)]=I$ means white nose in space.

The best suited weight vector with a maximum average signal to noise ratio of the received signal r(q) defined in Equation 1 is a maximum eigenvector corresponding to a maximum eigenvalue of a spatial covariance matrix $R_H(q)$ ($R_H(q)=E[H^H(q)H(q)]$).

Assuming that $R_H(q)=R_H$ ($R_H$ is referred to as a long-term spatial covariance matrix), the long-term spatial matrix $R_H$ can be calculated as in the following Equation 2.

$$R_H = (1-\rho)R_H + \rho R_{st}(q) \quad \text{[Equation 2]}$$

Here, $R_{st}(R_{st}(q)=H^H(q)H(q))$ is an instantaneous channel covariance and $\rho(0 \leq \rho \leq 1)$ is a forgetting factor. To obtain an eigenbeam forming vector, eigendecomposition can be applied to $R_H$ as in the following Equation 3.

$$R_H = EDE^H \quad \text{[Equation 3]}$$

Here, D is a diagonal matrix ($D=\text{diag}(\lambda_1, \lambda_2, \ldots, \lambda_L)$, E is a unit matrix ($E=[e_1, e_2, \ldots, e_L]$), $\lambda_1 \geq \lambda_2 \geq \ldots \geq \lambda_L$ are eigenvalues, and $e_l$ is a eigenvector corresponding to the eigenvalue $\lambda_l$.

When the base station finds an $N_f(<L)$ number of the dominant eigenvector corresponding to the biggest eigenvalue on the basis of the feedback information, the long-term spatial covariance matrix is gradually changed. Thus, the feedback rate for transmitting the eigenbeam vector is reduced, and the amount of feedback is also reduced. At this time, the eigenbeam vector is used as the weight vector for forming a beam in the downlink, and the eigenbeam vector has orthogonality. Thus, the eigenbeam vector can generate an independent channel or transmitting mode to the mobile terminal, and the eigenbeam vector is referred to the eigenmode. Here, the eigenvalue of the instantaneous channel covariance is calculated from the long-term feedback of $N_f$ eigenvectors and fast fading, and the information is fed back to select a best eigenvector with a maximum eigenvalue among $N_f$ eigenvectors.

Meanwhile, assuming that the base station recognizes an $N_f(<L)$ number of the dominant eigenvectors corresponding to the biggest eigenvalue on the basis of the feedback information, the eigenvalue of the instantaneous channel covariance is calculated from the long-term feedback of $N_f$ eigenvectors and fast fading, and the information is fed back to select a best eigenvector with a maximum eigenvalue among $N_f$ eigenvectors and the information is fed back short-term to select a best eigenvector with a maximum eigenvalue among $N_f$ eigenvectors. The short-term feedback ratio is higher than the long-term feedback ratio, but the amount of the feedback information is only $\log_2(N_f)$, since the feedback is for simply selecting the best suited one among the $N_f$ eigenvectors.

The best suited eigenvector w(q) for maximizing the instantaneous signal to noise ratio can be calculated from the maximum short-term channel gain, as in the following Equation 4.

$$w(q) = \arg\max_{e_n, n=1,2,\ldots,N_f} \|H(q)e_n\|^2 \quad \text{[Equation 4]}$$

Here, the short-term feedback ratio is higher than the long-term feedback ratio, but the amount of the feedback information is only $\log_2(N_f)$ since the feedback is for simply selecting the best suited one among the $N_f$ eigenvectors.

However, as described above, when the beam forming method is applied to the OFDM system, each subcarrier may use a different beam forming vector, since each subcarrier is differently faded at the frequency selective fading channel. Therefore, the amount of feedback increases when using different beam forming vectors.

The exemplary embodiment of the present invention shows that the spatial covariance matrix is the same for all subcarriers, and the eigenbeam forming method in which the amount of the feedback of the eigenvector is reduced is significantly effective in the OFDM system.

It is assumed that K subcarriers are assigned in downlink of the MIMO-OFDM system, and the number of transmit antennas is L and the number of receive antennas is M.

Here, the K×1 OFDM symbol is s(t), and the L×1 weight vector $w_k(t)$ is a beamforming vector for the $k^{th}$ symbol $s_k(t)$ of s(t). Then, the transmitting signal S(t) in a space and frequency domain is as in the following Equation 5.

$$S(t)=[w_1(t) w_2(t) \ldots w_K(t)]D(t) \quad \text{[Equation 5]}$$

Here, D(t) is a diagonal matrix of data symbols, and $D(t)=\text{diag}\{s_1(t), s_2(t), \ldots, s_K(t)\}$.

The frequency response of a channel between the transmit antenna I and the receive antenna m is as in the following Equation 6.

$$\tilde{h}_{k,m,l} = \sum_{p=0}^{P-1} h_{p,m,l} d^{-j2\pi pk/K} \quad \text{[Equation 6]}$$

Here, $\{h_{p,m,l}\}_{p=0, 1, \ldots, P-1, m=1, \ldots, M, l=1, \ldots, L}$ is a channel impulse response (CIR) between the transmit antenna I and the receive antenna m; P is a length of the channel impulse response, that is, the number of multipaths; and k is an index of the subcarriers. It is assumed that the channel impulse response is any sequence of which average is 0 and satisfies the following Equation 7.

$$E[H_p{}^H H_{p'}]=\sigma_{h,p}{}^2 R_{H_p} \delta_{p,p'} \quad \text{[Equation 7]}$$

Here, $[H_p]_{m,l}=h_{p,m,l}$, $\sigma_{h,p}{}^2$ is a power delay profile of the channel impulse response, and $$[R_{H_p}]_{s,t} = \frac{1}{\sigma_{h,p}^2} E[h_{p,m,s}^* h_{p,m,t}] \quad s,t = 1, 2, \ldots L.$$

According to the Equation 7, it is assumed that an $R_H$ normalized spatial covariance matrix in the time domain is the same at all multipaths, and there is no correlation between multipath coefficients. The MIMO channel matrix corresponding to the $k^{th}$ subcarrier can be described as in the following Equation 8.

$$[\tilde{H}_k]_{m,l}=\tilde{h}_{k,m,l}, m=1, 2, \ldots, M, l=1, 2, \ldots, L \quad \text{[Equation 8]}$$

Then, the spatial covariance matrix of the channel $\tilde{H}_k$ in the frequency domain can be described as in the following Equation 9.

$$R_{\tilde{H}_k}=E[\tilde{H}_k{}^H \tilde{H}_k] \quad \text{[Equation 9]}$$

The Equation 9 can be developed by using Equations 6 and 7 as in the following Equation 10.

$$\begin{aligned}[][R_{\tilde{H}_k}]_{s,t} &= \sum_{m=1}^{M} E[\tilde{h}_{k,m,s}^* \tilde{h}_{k,m,t}] \quad s,t = 1, 2, \ldots L \\
&= \sum_{m=1}^{M} E\left[\left(\sum_{p=0}^{P-1} h_{p,m,s} e^{-j2\pi pk/N}\right) * \left(\sum_{p'=0}^{P-1} h_{p',m,t} e^{-j2\pi p'k/N}\right)\right] \\
&= \sum_{m=1}^{M} \sum_{p=0}^{P-1} E[h_{p,m,s}^* h_{p,m,t}] \\
&= \sum_{p=0}^{P-1} \sigma_{h,p}^2 [R_{H_p}]_{s,t} \\
&= R_{\tilde{H}} \\
&\triangleq \left[\sum_{p=0}^{P-1} \sigma_{h,p}^2 R_{H_p}\right]_{s,t}
\end{aligned} \quad \text{[Equation 10]}$$

Equation 10 shows that the spatial covariance matrix $R_{\tilde{H}_k}$ of the channel $\tilde{H}_k$ of each subcarrier is independent from any subcarrier k, and is always the same.

Each subcarrier has a different channel property in the OFDM system, since each subcarrier is selectively faded at different frequencies. However, Equations 6, 7, and 10 show that all subcarriers have the same spatial covariance matrix.

Thus, it is not necessary to calculate a spatial covariance matrix at subcarriers, and the spatial covariance calculated at one subcarrier can be used for forming eigenbeams at the subcarriers. Thus, the amount of calculation can be significantly reduced. Further, the averaging length can be reduced by calculating the spatial covariance in a two dimensional domain which uses the frequency domain and the time domain of the subcarriers at the same time. The OFDM system can more actively meet a channel change. Further, since the subcarriers have the same eigenvector group, the amount of feedback information is properly reduced and becomes the same as in the case of the system with the single subcarrier. Thus, the eigenbeam forming method can be easily applied to the OFDM system.

Hereinafter, a first exemplary embodiment of the present invention is described in detail with reference to appended drawings.

FIG. 1 shows a MIMO-OFDM system according to a first exemplary embodiment of the present invention. FIG. 1 is a block diagram for describing the idea and construction of the present invention in an FDD mode.

As referred to in FIG. 1, the MIMO-OFDM system according to the first exemplary embodiment of the present invention is an OFDM system with K subcarriers. The OFDM system comprises a transmitter 10 with L transmit antennas 131a, 131b, ..., 131L, a receiver 20 with M receive antennas 231a, 231b, ..., 231M, and an uplink feedback device 40 for transferring information of the receiver 20 to the transmitter 10.

The transmitter 10 comprises a serial/parallel converter (S/P converter) 100, a signal reproducer 110, an eigenmode generator 120, inverse fast Fourier transformers 130a, 130b, ..., 130L, and L transmit antennas 131a, 131b, ..., 131L.

The receiver 20 comprises receive antennas 231a, 231b, ..., 231M, fast Fourier transformers 230a, 230b, ..., 230M, an eigenbeam calculator 220, a symbol detector 210, and a parallel/serial converter 200.

The serial/parallel converter 100 of the transmitter 10 is a device for converting continuously inputted K symbols to K parallel signals. K indicates the number of subcarriers. The signal reproducer 110 is a device for reproducing K parallel signals 101a, 101b, ..., 101K outputted from the serial/parallel converter 100 L times, which is the number of transmit antennas. That is, the $l^{th}$ signal among the reproduced signals 111a, 111b, ..., 111L outputted from the signal reproducer 110 are the same (l=1, 2 to L).

The eigenmode generator 120 is a device for generating eigenbeams of the reproduced signals 111a, 111b, ..., 111L outputted from the signal reproducer 110 at each subcarrier, on the basis of $N_f$ eigenbeam forming vectors and information of a best eigenbeam forming vector at each subcarrier. Here, the eigenbeam forming vectors are calculated by the eigenbeam calculator 220 of the receiver and are fed back long-term by the uplink feedback device 40, but the subcarriers have the same eigenbeam forming vector group. Further, the information of a best eigenbeam forming vector is fed back short-term by the uplink feedback device 40. That is, the eigenmode generator 120 is a device for generating $N_f$ eigenmodes by using $N_f$ eigenbeam forming vectors fed back long-term and selecting a best eigenmode among $N_f$ eigenmodes generated in accordance with the best beamforming eigenbeam forming vector fed back short-term. At this time, the information of the best eigenbeam forming vector is required to be fed back within a coherent time. The $N_f$ eigenmodes are updated whenever the eigenbeam forming vectors are fed back, and the best eigenbeam forming vector among those is short-term selected.

The L inverse Fourier converters 130a, 130b, ..., 130L are devices for receiving K signals respectively and generating one OFDM symbol. The OFDM symbols generated from the L inverse Fourier converters 130a, 130b, ..., 130L are the same. The OFDM symbols generated from the inverse Fourier converters are transmitted through the corresponding antennas 130a, 130b, ..., 130L.

The Fourier converters 230a, 230b, ..., 230M of the receiver 20 receive signals received through M receive antennas and perform Fourier conversion to the signals and output K signals 221a, 221b, ..., 221M. The eigenbeam calculator 220 is a device for estimating a channel to the signals outputted from the Fourier converters 230a, 230b, ..., 230M and calculating the instantaneous covariance and the spatial covariance according to Equation 2 and the $N_f$ dominant eigenvectors according to Equation 3. At this time, the spatial covariance matrix can be obtained from only one subcarrier, or from the two dimension domain using both the frequency domain and the time domain according to Equation 10. The instantaneous channel covariance is calculated for each channel. The eigenbeam calculator 260 selects one vector with the maximum eigenvalue among $N_f$ eigenbeam forming vectors for the instantaneous channel covariance, and transfers the number of vectors to the uplink feedback device 40.

The symbol detector 210 is a device for detecting K symbols inputted to the signal reproducer 110 of the receiver 10 at the same time by using the channel estimate obtained from the eigenbeam calculator 260. The parallel/serial converter 200 is a device for converting the K symbols to the serial signals.

The uplink feedback device 40 is a device for long-term feedback of the eigenbeam forming vector obtained from the eigenbeam calculator 260 of the receiver 20 and short-term feedback of the number of the best eigenbeam forming vector. According to Equation 10, the subcarriers have the same eigenbeam forming vector. Thus, the feedback can be achieved through one subcarrier instead of all subcarriers. Further, the information of the feedback can be divided into each subcarrier to reduce a feedback delay. However, the instantaneous channel covariance is different for each subcarrier, and thus the instantaneous channel covariance is required to be fed back for all subcarriers.

As such, according to the first exemplary embodiment of the present invention, it is not necessary to calculate a spatial covariance matrix at the subcarriers, and the spatial covariance calculated at only one subcarrier can be used for forming eigenbeams at the subcarriers. Thus, the amount of calculation can be significantly reduced. Further, the averaging length can be reduced by calculating the spatial covariance in a two dimensional domain using both the frequency domain and the time domain of all subcarriers. The OFDM system according to the first exemplary embodiment can more actively meet channel change. More specially, in the FDD mode wherein the information for the eigenbeam forming of the transmitter is required to be fed back from the receiver, the amount of the long-term feedback information can be significantly reduced, since the eigenbeam forming vector for only one subcarrier is required to be fed back, and the eigenbeam forming vectors for all subcarriers are not required.

Figure 2:
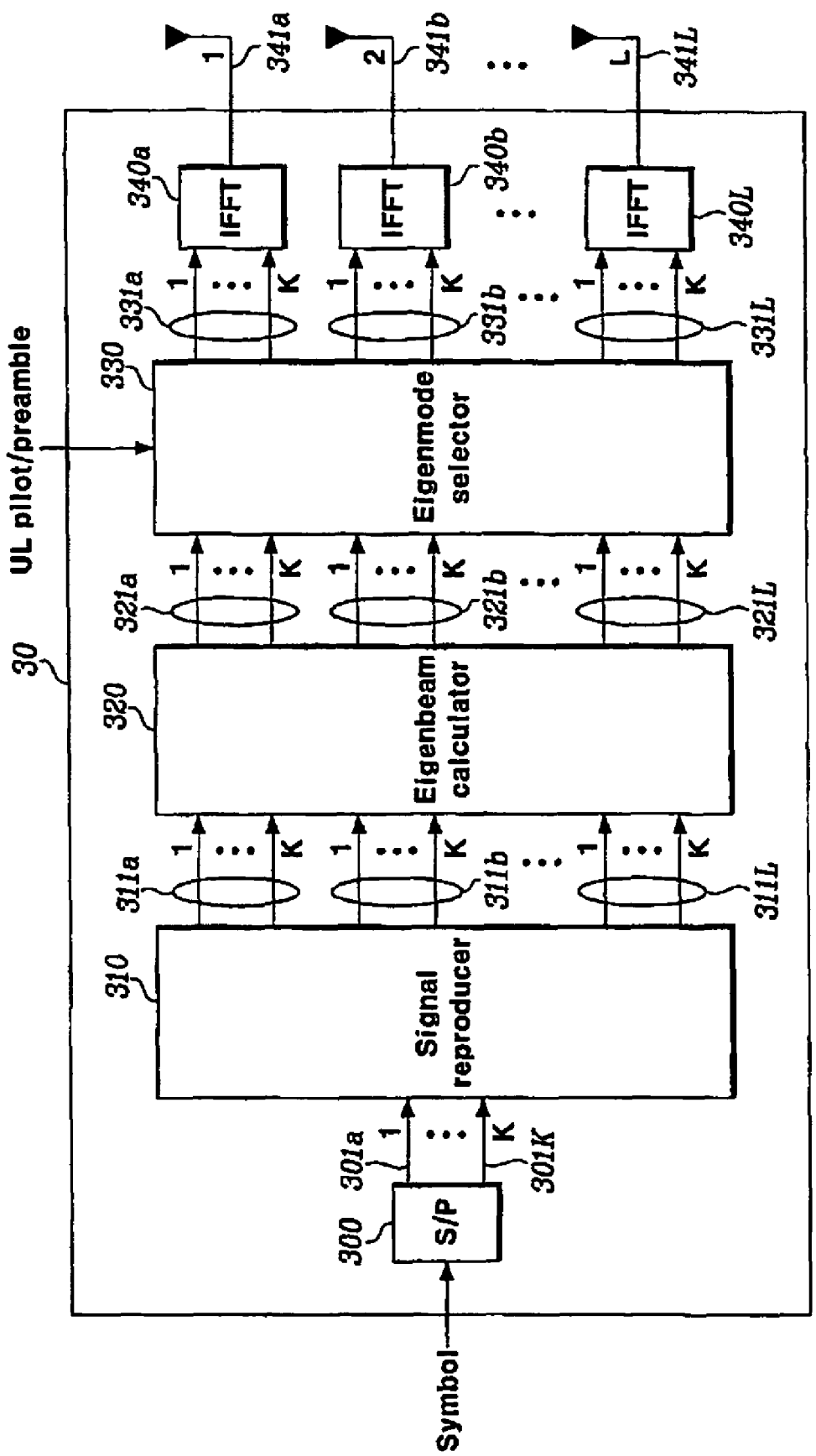
FIG. 2 shows a MIMO-OFDM system according to a second exemplary embodiment of the present invention.

FIG. 2 shows a MIMO-OFDM system according to a second exemplary embodiment of the present invention. FIG. 2 is a block diagram for explaining the idea and construction of the present invention in the time division duplexing (TDD) mode.

As referred to in FIG. 2, only the receiver of the base station is described, since it is not necessary to feed back the channel information due to channel reciprocity in the TDD mode, different from the first exemplary embodiment shown in FIG. 1.

According to FIG. 2, the OFDM system according to the second exemplary embodiment of the present invention is a transmitter of the MIMO-OFDM system with K subcarriers. Thus, the transmitter according to the exemplary embodiment is set in the base station.

As referred to in FIG. 2, the transmitter 30 comprises a serial/parallel converter (S/P converter) 300, a signal reproducer 310, an eigenmode calculator 320, an eigenmode selector 330, inverse fast Fourier transformers 340a, 340b, ..., 340L, and L transmit antennas 341a, 341b, ..., 341L. The transmitter 30 transmits the eigenbeam forming signals through L transmit antennas.

The serial/parallel converter 300 of the transmitter 30 is a device for converting continuously inputted K symbols to K parallel signals. The K indicates the number of subcarriers. The signal reproducer 310 is a device for reproducing K parallel signals 301a, 301b, ..., 301K L times. The L indicates the number of transmit antennas.

The eigenmode calculator 320 is a device for calculating the instantaneous channel covariance and the spatial covariance from the uplink channel information obtained from the receiver (not shown) of the base station according to Equation 2; calculating $N_f$ dominant eigenbeam forming vectors according to Equation 3; and calculating the eigenvalue of the instantaneous channel covariance. At this time, the instantaneous channel covariance is obtained from only one subcarrier, or from the two dimensional domain using both the frequency domain and the time domain according to Equation 10. The instantaneous channel covariance is frequently updated within coherent time, but since the spatial covariance matrix needs averaging lengths, the spatial covariance matrix is slowly updated every averaging length.

The eigenmode selector 330 is a device for selecting only one eigenmode of which the eigenvalue of the instantaneous channel covariance is maximum among $N_f$, whenever $N_f$ eigenbeam forming vectors are inputted from the eigenbeam forming calculator 320 and the instantaneous channel covariance is updated. Each of the inverse Fourier converters 340a, 340b, ..., 340L is a device for receiving K signals and generating one OFDM symbol. The OFDM symbols generated from the L inverse Fourier converters 340a, 340b, ..., 340L are the same.

Hereinafter, the third exemplary embodiment of the present invention is described.

In the OFDM system, the subcarriers have $N_f$ dominant eigenvectors, but the best eigenmode to be selected can be different at each subcarrier since each subcarrier has a different frequency selective fading channel. However, close subcarriers are similarly faded, thus the same eigenmode can be selected for close subcarriers.

The K subcarriers can be divided into $K_f(\leq K)$ groups. Each group includes $\overline{K}$ close subcarriers, and each group selects the same eigenmode. Thus, total amount of feedback becomes $K_f \cdot \log_2(N_f)$. That is, the amount of feedback becomes $(K/\overline{K}) \cdot \log_2(N_f)$, so the amount of feedback is reduced $1/\overline{K}$ times.

When $G_g = \{\overline{K}g+1, \overline{K}g+2, \ldots, \overline{K}(g+1)\}$, $g=1, 2, \ldots, K_f$ is a $g^{th}$ group of subcarriers, the beamforming vector of the $g^{th}$ group of subcarriers can be expressed as in the following Equation 11.

$$w_g(t) = \arg\max_{e_x, n=1,2,\ldots,N_f} \sum_{k \in G_g} \|\tilde{H}_k(t)e_n\|^2 \quad \text{[Equation 11]}$$

As such, the third exemplary embodiment of the present invention divides the subcarriers into groups of close subcarriers and reduces the amount of feedback by selecting the same eigenmode for each group.

Hereinafter, the third exemplary embodiment of the present invention is described in detail with reference to the appended drawings.

The MIMO-OFDM system according to the third exemplary embodiment of the present invention has similar construction to the MIMO-OFDM system according to the first exemplary embodiment. Thus repeated explanation is not given.

Figure 3:
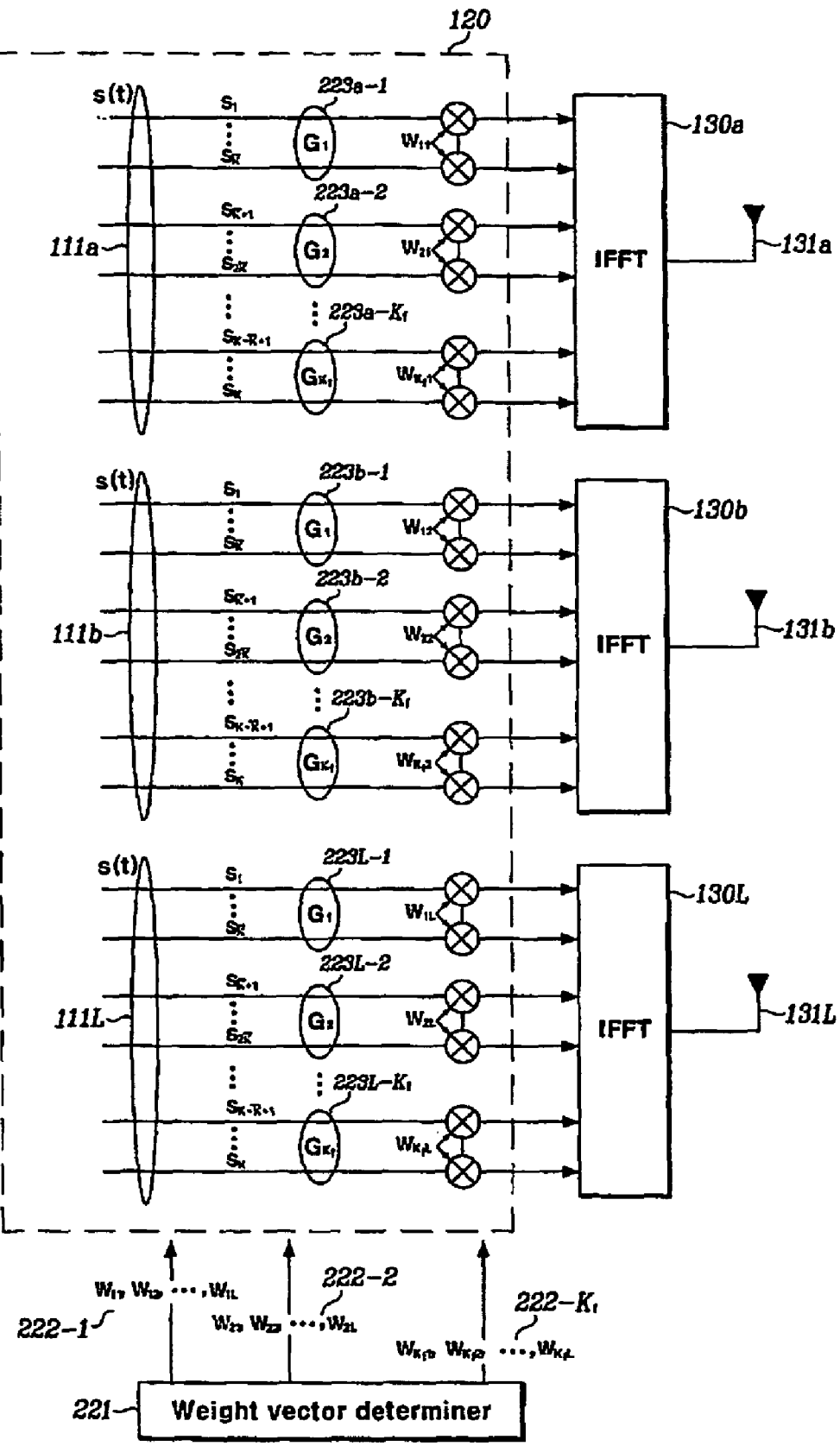
FIG. 3 shows an eigenmode generator according to a third exemplary embodiment of the present invention.

FIG. 3 shows an eigenmode generator 120 according to a third exemplary embodiment of the present invention.

As shown in FIG. 3, the input for the eigenmode generator 120 according to the third exemplary embodiment of the present invention includes L parallel signals 111a, 111b, ..., 111L reproduced from K parallel signals s(t), and the short-term feedback information and the long-term feedback information provided through the uplink feedback device 40.

The eigenmode generator 120 divides L parallel signals reproduced from K parallel signals s(t) into $K_f$ groups of the $\overline{K}$ parallel signals respectively. That is, the eigenmode generator 120 divides K parallel signals 111a into $K_f$ groups $G_1$, $G_2, \ldots, G_{K_f}$ 223a-1, 223a-2, ..., 223a-Kf of the $\overline{K}$ parallel signals, and divides K parallel signals 111b into $K_f$ groups 223b-1, 223b-2, ..., 223b-Kf of the $\overline{K}$ parallel signals. The process is repeated by the number of the transmit antennas 223L-1, 223L-2, ..., 223L-Kf.

Further, the eigenmode generator 120 multiplies Kf weight vectors by the signals of the group. The Kf weight vectors are obtained from the weight vector determiner 221. In detail, the eigenmode generator 120 multiplies the first vector $w_1 = (w_{11}, w_{12}, \ldots, w_{1L})$ (221-1) among the Kf weight vectors by $G_1$ 223a-1, 223b-1, ..., 223L-1, the signal of the first group of each antenna. That is, the eigenmode generator 120 multiplies signals $s_1, s_2, \ldots, s_{\overline{K}}$ corresponding to $G_1$ of the first antenna by $w_{11}$, multiplies signals $s_1, s_2, \ldots, s_{\overline{K}}$ corresponding to $G_1$ of the second antenna by $w_{12}$, and multiplies signals $s_1, s_2, \ldots, s_{\overline{K}}$ corresponding to $G_1$ of the $L^{th}$ antenna by $w_{1L}$. Thus, subcarrier signals $s_1, s_2, \ldots, s_{\overline{K}}$ generate one eigenbeam.

In the same manner, the eigenmode generator 120 multiplies the second vector $w_2 = (w_{21}, w_{22}, \ldots, w_{2L})$ 222-2 by $G_2$ 223a-2, 223b-2, ..., 223L-2 of the second group of each antenna. Here, the signals $s_{\overline{K}+1}, s_{\overline{K}+2}, \ldots, s_{2\overline{K}}$ of the subcarrier are owned in common. This process is repeated until the eigenmode generator 120 multiplies the $Kf^{th}$ vector $w_{K_f} = (w_{K_f1}, w_{K_f2}, \ldots, w_{K_fL})$ 222-Kf by $G_{K_f}$ 223a-Kf, 223b-Kf, ..., 223L-Kf of the $Kf^{th}$ group of each antenna. Here, the signals $s_{K-\overline{K}+1}, s_{K-\overline{K}+2}, \ldots, s_K$ of the subcarrier are owned in common.

As a result, the eigenmode generator 120 generates one eigenbeam for each group of subcarriers and the subcarriers in the group own the eigenbeam. Thus, the eigenmode generator 120 generates Kf eigenbeams for all subcarriers.

Figure 4:
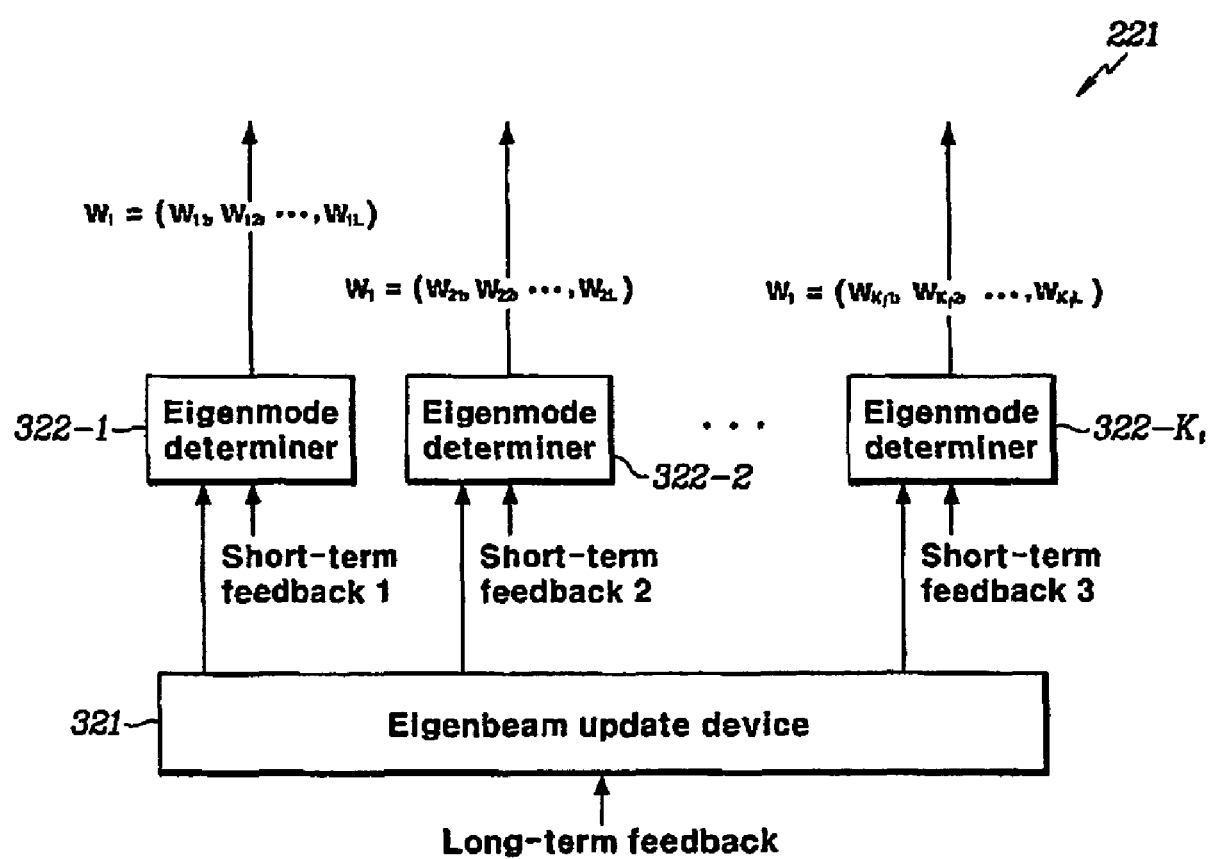
FIG. 4 shows a beamforming weight vector determiner shown in FIG. 3.

FIG. 4 shows a weight vector determiner 221 in the eigenmode generator in detail. As shown in FIG. 4, the weight vector determiner 221 comprises an eigenbeam update device 321 and Kf eigenmode determiners 322-1, 322-2, ..., 322-Kf.

As referred to in FIG. 4, the eigenbeam update device 321 updates $N_f$ eigenbeam vectors through the uplink feedback device 40 whenever the long-term feedback information is provided. At this time, the eigenbeam vector being updated is the same for all subcarriers. The Kf eigenmode determiners 322-1, 322-2, ..., 322-Kf receive $N_f$ same eigenbeam vectors outputted from the eigenbeam update device 321, and the eigenmode determiner selects one among $N_f$ eigenbeam vectors inputted in accordance with the uplink feedback device 40 and determines the eigenmode. The eigenmodes selected by each eigenmode determiner are expressed as a weight vector. The Kf eigenmode determiners 322-1, 322-2, ..., 322-Kf output $w_1 = (w_{11}, w_{12}, \ldots, w_{1L})$, $w_2 = (w_{21}, w_{22}, \ldots, w_{2L})$, and $w_{K_f} = (w_{K_f1}, w_{K_f2}, \ldots, w_{K_fL})$ respectively.

Figure 5:
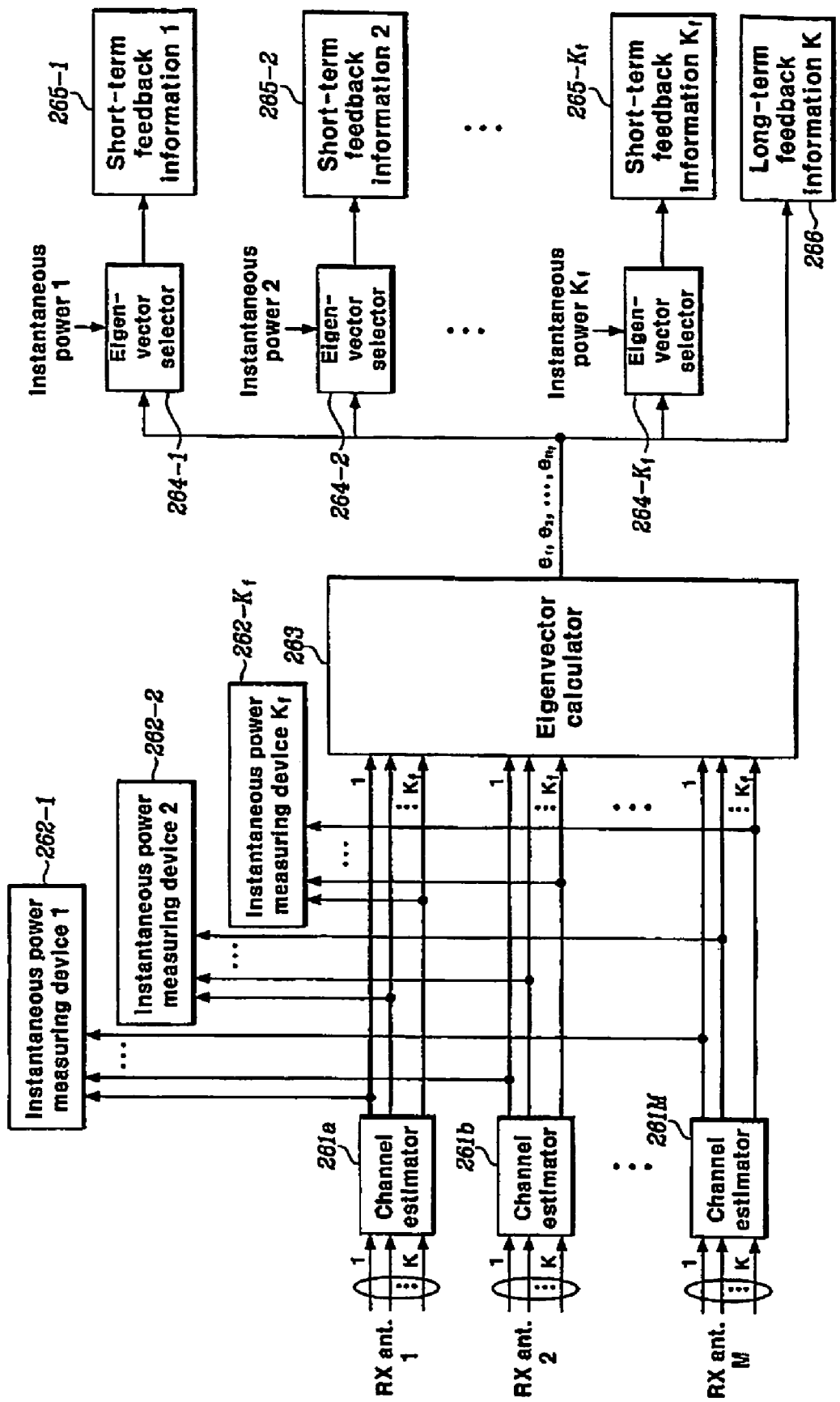
FIG. 5 shows an eigenbeam calculator according to a third exemplary embodiment of the present invention.

FIG. 5 shows an eigenbeam calculator 260 according to the third exemplary embodiment of the present invention.

As shown in FIG. 5, the eigenbeam calculator 260 comprises M channel estimators 261a, 261b, ..., 261M, Kf instantaneous power measuring devices 262-1, 262-2, ..., 262-Kf, eigenvector calculator 263, and Kf eigenvector selectors 264-1, 262-2, ..., 262-Kf.

The channel estimators 261a, 261b, ..., 261M estimate channels to M pairs of parallel signals inputted respectively at each subcarrier. The eigenvector calculator 263 obtains the channel spatial covariance from the signals outputted from the channel estimators 261a, 261b, . . . , 261M by using Equation 7 and Equation 10, the channel spatial covariance being the same for all subcarriers. Then the eigenvector calculator 263 calculates $N_f$ dominant eigenvectors $e_1, e_2, \ldots, e_{N_f}$ according to Equation 2, and provides $N_f$ dominant eigenvectors to Kf eigenvector selectors 264-1, 262-2, . . . , 262-Kf.

The instantaneous power measuring devices 262-1, 262-2, . . . , 262-Kf receive signals outputted from the each channel estimator and measure the instantaneous power. That is, the estimated channel values for each subcarrier by each channel estimator are orderly divided into Kf groups of $\overline{K}$ signals. The first $\overline{K}$ signals are provided to the instantaneous power measuring device 1 262-1, then $\overline{K}$ signals are provided to the instantaneous power measuring device 2 262-2, and last $\overline{K}$ signals are provided to the instantaneous power measuring device Kf 262-Kf.

Each instantaneous power measuring device measures the instantaneous power by using the M pairs of estimated $\overline{K}$ signals, and provides the measured instantaneous power to the eigenvector selectors 264-1, 264-2, . . . , 264-Kf.

The eigenvector selectors 264-1, 264-2, . . . , 264-Kf select one eigenvector with maximum instantaneous power among $N_f$ dominant eigenvectors $e_1, e_2, \ldots, e_{N_f}$ inputted by using the instantaneous powers inputted from the corresponding instantaneous measuring devices. Then, the eigenvector with the maximum instantaneous power becomes the short-term feedback information.

In detail, the first eigenvector selector selects one eigenvector of which the instantaneous power is maximum among $N_f$ dominant eigenvectors $e_1, e_2, \ldots, e_{N_f}$ inputted, by using the instantaneous power inputted from the first instantaneous measuring device 262-1. Then, the eigenvector with maximum instantaneous power becomes the short-term feedback information 265-1. The second eigenvector selector selects one eigenvector with the maximum instantaneous power from among the $N_f$ dominant eigenvectors $e_1, e_2, \ldots, e_{N_f}$ inputted by using the instantaneous power inputted from the second instantaneous measuring device 262-2. Then, the eigenvector with the maximum instantaneous power becomes the short-term feedback information 265-2.

The process is repeated until the $Kf^{th}$ eigenvector selector selects one eigenvector with the maximum instantaneous power from among the $N_f$ dominant eigenvectors $e_1, e_2, \ldots, e_{N_f}$ inputted by using the instantaneous power inputted from the $Kf^{th}$ instantaneous measuring device 262-2. Then, the eigenvector with the maximum instantaneous power becomes the short-term feedback information 265-Kf. Each short-term feedback information determined by the eigenvector selectors is constructed by $\log_2(N_f)$ bit, wherein Nf is the number of the eigenvector. However, since $\overline{K}$ close subcarriers among K subcarriers own the eigenvector in common, the short-term feedback is not performed at each subcarrier. Since the $\overline{K}$ subcarriers provide one set of feedback information, the amount of the short-term feedback information is reduced 1/$\overline{K}$ times.

Further, the long-term feedback information 266 is obtained by quantizing the amplitude and phase of each dominant eigenvector $e_1, e_2, \ldots, e_{N_f}$ of the channel spatial covariance matrix obtained from the eigenvector calculator 263. The long-term feedback information is slowly updated, since the channel spatial covariance matrix is slowly changed.

The short-term feedback information and the long-term feedback information are inputted to the eigenmode generator 120 in the receiver 10 through the uplink feedback device 40 of FIG. 1. For the short-term feedback information, $\overline{K}$ close subcarriers are required to feed back Kf feedback information at least one time within a coherent time. Otherwise, for the long-term feedback information, all subcarriers slowly feedback only one information set.

As described above, according to the exemplary embodiment of the present invention, $\overline{K}$ close subcarriers among all K subcarriers form a group and the all K subcarriers are divided into $K_f (\leq K)$ groups, and each group selects the same eigenvector. Thus, since the total amount of feedback becomes $(K/\overline{K}) \cdot \log_2(N_f)$, the total amount of feedback is reduced to 1/$\overline{K}$. The burden to the system can therefore be reduced.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims. For example, the device according to the exemplary embodiment of the present invention can be embodied as hardware or software. Also, the present invention can be embodied as code on a readable medium which a computer can read.

As described above, according to the present invention, when the eigenbeam forming method is applied to the OFDM system, the spatial covariance matrix being necessary for the eigenbeam forming can be calculated for one subcarrier instead of all subcarriers, and thus the amount of calculations can be significantly reduced. Further, the averaging length can be reduced by calculating the spatial covariance in a two dimensional domain which uses the frequency domain and the time domain of all subcarriers at the same time. Thus, the present invention can more actively meet channel change.

Further, according to the present invention, when the eigenbeam forming method is applied to the OFDM system, close subcarriers among all K subcarriers form a group and all K subcarriers are divided into a predetermined number of groups, and each group selects the same eigenvector. Thus, since the total amount of feedback is reduced, the burden to system can be reduced.

What is claimed is:

1. A Multiple Input Multiple Output (MIMO)—Orthogonal Frequency Division Multiplexing (OFDM) system comprising a transmitter with L transmit antennas, a receiver with M receive antennas, and an uplink feedback device for providing Information of the receiver to the transmitter, wherein the transmitter comprises:

a serial/parallel converter for converting continuously inputted symbols of a number of subcarriers to K parallel signals;

a signal reproducer for reproducing the K parallel signals by the L transmit antennas;

an eigenmode generator for generating eigenbeams of the reproduced K parallel signals outputted from the signal reproducer at each subcarrier, based on $N_f$ eigenbeam forming vectors which are fed back long-term and information of a best eigenbeam forming vector at each subcarrier which is fed back short-term, through the uplink feedback device; and a plurality of inverse Fourier converters for receiving K signals outputted from the eigenmode generator and generating an OFDM symbol.

2. The MIMO-OFDM system of claim 1, wherein the eigenmode generator updates at least one eigenbeam forming vector stored previously, whenever information of at least one same eigenbeam forming vector for subcarriers is fed back through the uplink feedback device.

3. The MIMO-OFDM system of claim 1, wherein the receiver comprises an eigenbeam calculator for estimating a channel to the signal transferred from the transmitter and calculating an instantaneous channel covariance and a spatial covariance matrix, and $N_f$ dominant eigenbeam forming vectors.

4. The MIMO-OFDM system of claim 3, wherein the eigenbeam calculator calculates the instantaneous channel covariance at each subcarrier for each symbol, and calculates the spatial covariance matrix at only one subcarrier for each symbol.

5. The MIMO-OFDM system of claim 4, wherein the eigenbeam calculator obtains an eigenvalue of the instantaneous channel covariance and provides the eigenvalue to the uplink feedback device within a coherent time, and obtains at least one best eigenbeam forming vector from the spatial covariance matrix and provides the at least one best eigenbeam forming vector to the uplink feedback device.

6. The MIMO-OFDM system of claim 5, wherein the uplink feedback device performs long-term feedback of information of the eigenbeam forming vector transferred from the eigenbeam calculator to the eigenmode generator, and performs short-term feedback of the number of the dominant eigenbeam forming vector transferred from the eigenbeam calculator to the eigenmode generator.

7. The MIMO-OFDM system of claim 3, wherein the eigenbeam calculator calculates the spatial covariance matrix in a two dimension domain which uses both a frequency domain and a time domain of subcarriers.

8. A Multiple Input Multiple Output (MIMO)—Orthogonal Frequency Division Multiplexing (OFDM) system comprising:
   a serial/parallel converter for converting continuously inputted symbols of a number of subcarriers to K parallel signals;
   a signal reproducer for reproducing the K parallel signals outputted from the serial/parallel converter by a number of transmit antennas;
   an eigenbeam calculator for calculating an instantaneous channel covariance and a spatial covariance matrix by using uplink channel information, providing $N_f$ dominant eigenbeam forming vectors from the spatial covariance matrix, and providing an eigenvalue of the instantaneous channel covariance;
   an eigenmode selector for selecting an eigenmode of which the eigenvalue of the instantaneous channel covariance is maximum among $N_f$, whenever $N_f$ eigenbeam forming vectors are inputted from the eigenbeam calculator and the instantaneous channel covariance is updated; and
   a plurality of inverse Fourier converter for receiving K signals outputted from the eigenmode selector, and generating an OFDM symbol.

9. The MIMO-OFDM system of claim 8, wherein the eigenbeam calculator calculates the instantaneous channel covariance at each subcarrier for each symbol, and calculates the spatial covariance matrix at only one subcarrier for each symbol or calculates the instantaneous channel covariance in a two dimensional domain which uses both a frequency domain and a time domain of subcarriers.

10. The MIMO-OFDM system of claim 8, wherein the eigenbeam calculator calculates the spatial covariance matrix in a two dimensional domain which uses both a frequency domain and a time domain of subcarriers.

11. The MIMO-OFDM system of claim 9, wherein the eigenbeam calculator obtains the eigenvalue of the Instantaneous channel covariance and provides the eigenvalue to the eigenmode selector, and obtains at least one dominant eigenbeam forming vector from the spatial covariance matrix and provides the at least one dominant eigenbeam forming vector to the eigenmode selector.

12. A Multiple Input Multiple Output (MIMO)—Orthogonal Frequency Division Multiplexing (OFDM) system comprising a transmitter with L transmit antennas, a receiver with M receive antennas, and an uplink feedback device for providing information of the receiver to the transmitter, wherein the transmitter comprises:
   a serial/parallel converter for converting continuously inputted symbols of a number of subcarriers to K parallel signals;
   a signal reproducer for reproducing the K parallel signals outputted from the serial/parallel converter by the L transmit antennas;
   an eigenmode generator for generating one eigenbeam for each group of subcarriers, of based on long-term feedback information corresponding to $N_f$ eigenbeam forming vectors and short-term feedback information corresponding to a group of subcarriers which are provided through the uplink feedback device; and
   a plurality of inverse Fourier converters for receiving K signals outputted from the eigenmode generator and generating an OFDM symbol.

13. The MIMO-OFDM system of claim 12, wherein the eigenmode generator generates the same eigenbeam corresponding to each group of subcarriers by dividing K parallel signals inputted from the signal reproducer into $K_f$ groups of $\overline{K}$ subcarriers, and multiplies each group of subcarriers by Kf weight vectors.

14. The MIMO-OFDM system of claim 13, wherein the eigenmode generator comprises a weight vector determiner for generating Kf weight vectors based on the long-term feedback information and the short-term feedback information.

15. The MIMO-OFDM system of claim 14, wherein the weight vector determiner comprises:
   an eigenbeam update device for updating $N_f$ eigenbeam vectors which subcarriers own in common, whenever the long-term feedback information is provided through the uplink feedback device; and
   Kf eigenmode determiners for receiving $N_f$ eigenbeam vectors and the short-term feedback information, and selecting one eigenbeam vector among $N_f$ eigenbeam vectors and outputting the eigenbeam vector as the weight vector.

16. The MIMO-OFDM system of claim 12, wherein the receiver comprises an eigenbeam calculator for estimating a channel to the signals outputted from the transmitter and providing an instantaneous covariance and a spatial covariance matrix, and $N_f$ dominant eigenvectors.

17. The MIMO-OFDM system of claim 16, wherein the eigenbeam calculator comprises:
   M channel estimators for estimating a channel of K signals transferred from the transmitter;
   Kf instantaneous power measuring devices for measuring each instantaneous power to a predetermined signal among K signals outputted from the M channel estimators;
   an eigenvector calculator for obtaining a channel spatial covariance matrix which is the same for subcarriers, for the signals outputted from the channel estimators, and calculating $N_f$ dominant eigenvectors; and
   an eigenvector selectors for selecting one eigenvector with maximum instantaneous power from among $N_f$ dominant eigenvectors by using the $N_f$ dominant eigenvectors outputted from the eigenvector calculator and the instantaneous power inputted from the corresponding instantaneous power measuring device, and providing the eigenvector with maximum instantaneous power for the short-term feedback information.

18. The MIMO-OFDM system of claim 17, wherein the eigenbeam calculator obtains the long-term feedback information by quantizing amplitude and phase of the dominant eigenvector of the channel spatial covariance matrix calculated by the eigenvector calculator.

19. The MIMO-OFDM system of claim 18, wherein the eigenbeam calculator transfers the long-term feedback information to the uplink feedback device within a coherent time, and transfers the short-term feedback information to the uplink feedback device.

20. A beam forming method for a Multiple Input Multiple Output (MIMO)—Orthogonal Frequency Division Multiplexing (OFDM) system comprising a transmitter with L transmit antennas and a receiver with M receive antennas, comprising:

(a) converting, at a serial/parallel converter, continuously inputted symbols of a number of subcarriers to K parallel signals;

(b) reproducing the K parallel signals by the L transmit antennas; and (c) generating one eigenbeam for each group of subcarriers, based on long-term feedback information corresponding to $N_f$ eigenbeam forming vectors and short-term feedback Information corresponding to the group of subcarriers, wherein the step (c) comprises:

dividing the reproduced K parallel signals into Kf groups of K subcarriers; and generating the same eigenbeam corresponding to each group of subcarriers by multiplying the Kf group of subcarriers by Kf weight vectors.

* * * * *